UNITED STATES PATENT OFFICE.

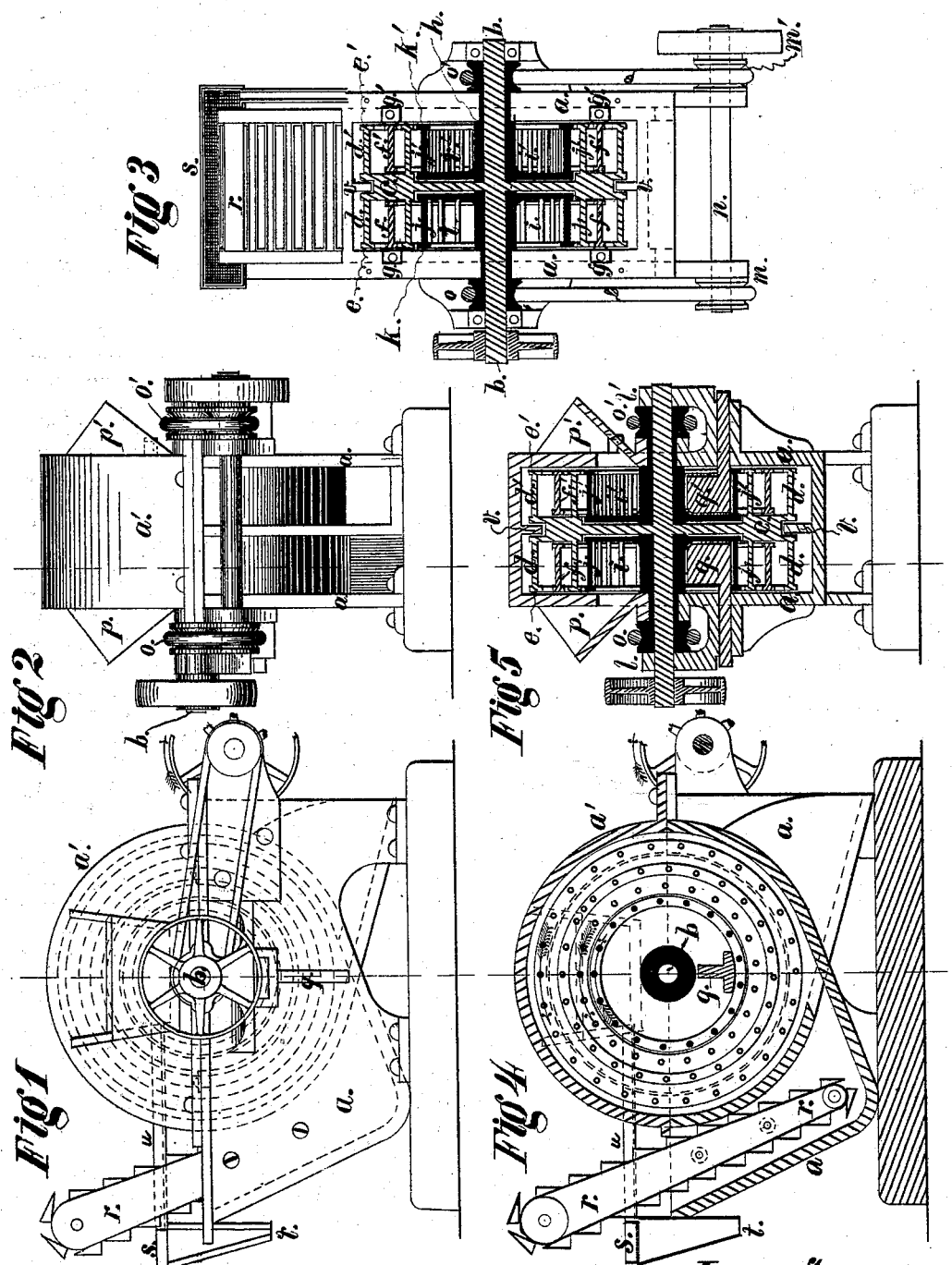

J. MOORE HENDRICKS, OF PHILADELPHIA, PENNSYLVANIA.

IMPROVEMENT IN DISINTEGRATING-MILLS.

Specification forming part of Letters Patent No. 150,689, dated May 12, 1874; application filed February 24, 1874.

*To all whom it may concern:*

Be it known that I, J. MOORE HENDRICKS, of Philadelphia, Pennsylvania, have invented an Improvement in Disintegrating-Mills, of which the following is a specification:

My invention is an improvement on the mill described in British Letters Patent No. 3,235 of 1868, issued to Thomas Carr. My improvement consists in constructing the mill, as hereinafter described, in two divisions arranged in juxtaposition, but separated by a partition for the purpose of being enabled to employ one division for breaking, and the other division for completing the pulverization of the materials treated.

In the drawings, Figure 1 is a side elevation of the mill; Fig. 2, an end elevation; Fig. 3, a plan of the same, the top casing being removed and the cages being shown in section; Fig. 4, a longitudinal vertical section on the line $x\ x$ of Figs. 2 and 5; Fig. 5, a vertical cross-section through the center on the line $y\ y$ of Figs. 1 and 4.

$a$ is the casing of the mill. The upper portion $a'$ of the casing is removable, as shown in Figs. 1, 2, and 4. $b$ is a central solid shaft, supported from the casing, as shown. $c$ is a disk or wheel, rigidly attached to the shaft $b$, forming the bearing of the inner ends of the cross-bars $d$ and $d'$ of the outermost cages in each division of the mill, as shown in Figs. 3 and 5, the outer ends of said cross-bars $d$ and $d'$ being attached to rings $e$ and $e'$, respectively. The cages $f$ and $f'$ are made stationary, the outer rings of these cages being bolted to the casing, as shown at $g$ and $g'$, Fig. 3. The hollow shafts $h$ and $h'$, Figs. 3 and 5, carry the disks $i$ and $i'$, respectively, which form bearings for the inner ends of the cross-bars $j$ and $j'$ of the fourth or innermost cages, the outer ends of these cross-bars being attached to rings $k$ and $k'$, respectively. $l$ and $l'$, Figs. 3 and 5, are pulleys on said hollow shafts. $m$ and $m'$ are similar pulleys, arranged on the shaft $n$ exterior to the machine. $o$ and $o'$ are belts, which pass around the pulleys $l$ and $m$, $l'$ and $m'$, for imparting motion to the innermost cages, in the respective divisions. $p$ and $p'$ are hoppers, through which the materials to be disintegrated may be fed into the mill. $q$ and $q'$, Fig. 5, are solid bridges, to detain the materials and prevent them from being carried around with the cages without being acted on by the cross-bars. $r$ is the elevator, and $s$ is the reciprocating sieve, which act in common for both divisions of the mill.

The crude materials are broken up or partially disintegrated in the primary division of the mill, where they are introduced. They then pass into the receptacle formed for them in the casing, and are taken up by the elevator and emptied into the sieve $s$, by which the finer portions, or such as are fit for use, are sifted out and allowed to escape at $t$, Figs. 1 and 4. Such portions as are insufficiently reduced pass through the trough $u$, Figs. 1 and 4, into the innermost cage of the finishing division of the mill, where their disintegration is completed. The product of this division is lifted by the elevator into the sieve $s$, by which the finer portions are sifted out, any portions that are too coarse being passed through the trough $u$ back again into the finishing division of the mill, and so on continually. I am thus enabled to obviate the choking up of the breaking division of the mill, and to complete the disintegration of the materials more rapidly and more thoroughly.

The partition $v$, Figs. 3 and 5, divides the casing $a\ a'$, keeping the products of the primary or breaking division of the mill entirely separate from the products of the finishing division until they are taken up by the elevator.

The described mill may be made to embrace more than one elevator, if desired, and in such case a sieve, $s$, and a trough or conduit, $u$, for each elevator may be employed; or in any such case more than one such sieve or more than one such trough may be used.

I claim—

1. The mill constructed in two divisions, arranged in juxtaposition and separated by a partition in the casing, each division embracing a series of cages and a bridge for detaining the materials while they are being acted on by the said cages, in the manner and for the purpose substantially as set forth.

2. The mill constructed in two divisions, arranged in juxtaposition and separated by a partition, in combination with the elevator $r$, sieve $s$, and trough $u$, substantially as set forth.

J. MOORE HENDRICKS.

Witnesses:
 THOS. A. BURTT,
 ALBERT H. HOECKLEY.